Patented June 14, 1938

2,120,688

UNITED STATES PATENT OFFICE 2,120,688

METHOD OF MANUFACTURING SUBSTITUTED SUCCINIC ACIDS AND ESTERS THEREOF

Edmund B. Towne, St. Louis, Mo., assignor to Monsanto Chemical Company, St. Louis, Mo., a corporation of Delaware No Drawing. Application April 25, 1935,
Serial No. 18,185

4 Claims. (Cl. 260—106)

The present invention relates to methods of preparing ether derivatives of succinic acid and esters and salts thereof, and it has particular relation to methods of preparing these materials by condensation of an alcohol or phenol with esters or salts of such unsaturated dicarboxylic acids as maleic or fumaric acids.

The main objects of the invention are to provide:

A method of effecting the above described reactions which involves the use of inexpensive promotors that are not objectionable to handle in plant operations;

A process which is simple and inexpensive to conduct.

These and other objects will be apparent from perusal of the following specification.

The preparation of ethers containing as one organic group a succinic acid residue or an ester or salt thereof, by condensation of an alcohol or phenol with neutral maleic or fumaric acid esters and salts has heretofore been suggested. The resultant compounds are valuable as plasticizers in nitrocellulose, artificial and natural resins, as intermediates for preparation of alkyd type resins and for various other technical purposes.

In the preparation of these compounds it has been customary to effect the condensation between the unsaturated acid derivative and the hydroxy compound by bringing them into contact with each other in the presence of a small amount of metallic sodium. The metal reacts with the hydrogen of the hydroxyl group of the alcohol or phenol to liberate hydrogen and to form the corresponding alcoholate or phenolate. This alcoholate or phenolate (phenate) in turn reacts with the unsaturated acid present to form an ether derivative of the latter and to liberate the sodium for further reaction with additional free hydroxyl groups that may be present. It will thus be apparent that the reaction is catalytic in character and a small amount of sodium will promote the reaction between large amounts of the hydroxy compound and the acid ester. This method is objectionable because for large scale operation the cost of metallic sodium is considerable. Furthermore, it is an easily oxidizable and inflammable material which is difficult to handle under plant conditions.

Sodium hydroxide is known to form alcoholates and phenates and it would naturally be supposed that it might be substituted for the objectionable sodium. However, under usual conditions of operation, it is not suitable for the purpose and satisfactory results cannot be obtained by employing the caustic in lieu of metallic sodium.

The present invention is based upon the discovery that if an alcohol or phenol is reacted with sodium hydroxide or other caustic hydroxide, such as potassium hydroxide, under such conditions as to effect the elimination of the water of reaction, the resultant phenates or alcoholates will condense with the unsaturated acid salts or esters to form ether compounds and at the same time the sodium is liberated to form more of the alcoholate or phenate. It thus becomes possible to substitute sodium hydroxide as the catalytic material in the above described reactions.

In actual operations the caustic (for example, sodium hydroxide) is reacted with the desired alcohol or phenol in a preliminary step in conventional manner and the resultant alcoholate or phenate is treated to eliminate water, for example by subjecting it to distillation or by the addition of a suitable absorbent or combining agent for the water. This agent, of course, should be neutral with respect to the organic materials or at least its presence should not result in undesired side reactions. It will also be appreciated that the alcoholate or phenate may be subjected to distillation for purposes of removing the major portion of the water of reaction, and that the partially dehydrated material may then be treated with a small amount of a suitable water binding agent for removal of any possible traces of water remaining. Metallic sodium or metallic calcium are suggested for this purpose, although of course other materials will be obvious to those skilled in the art.

After the alcoholate or phenate is properly dehydrated it, in small amount, is admixed with an excess of alcohol or phenol and a neutral ester or salt or half ester of maleic or fumaric acid for purposes of effecting the desired condensation to form the ether compound. The temperature required for this reaction may vary over a relatively wide range and may, for example, be ordinary or room temperature although higher temperatures which are not in excess of the boiling points of the primary ingredients may also be employed. The ratios of the ingredients employed in the reaction may vary over a considerable range but usually an excess of the alcohol over theoretical proportions should be employed. For example, in the case of the preparation of di-normal-butyl-butyloxy-succinate about three molar equivalents of alcohol are incorporated with dibutyl maleate or fumarate in the presence of approximately one-fortieth of a mol. of sodium butylate prepared, as above described, by reacting sodium hydroxide with butyl alcohol and subsequently carefully removing all water of reaction. In this reaction to form di-normal-butyl-butyloxy-succinate the solution tends to heat up and during the course of the reaction it assumes a cherry red color. Preferably, the reaction is conducted under a reflux condenser to which is attached a calcium chloride tube for purposes of preventing the entrance of moisture into the reaction flask. The reaction mixture should be shaken frequently and allowed to stand for two or three days. However, this latter period may be shortened provided vigorous agitation is applied to the reacting ingredients. The resultant alkoxy esters (di-normal-butyl-butyloxy-succinate) are obtained from the reaction mixture by neutralizing with dilute hydrochloric acid. As a result of this treatment the ester layer separates and may be washed, dried and distilled. The dibutyl ester of butyloxy succinic acid boils at 168° C. at 6 mm. pressure (absolute), and is a solvent for nitrocellulose. It also dissolves benzyl cellulose when hot. It is miscible with linseed oil, Chinawood oil, soya bean oil, castor oil and petroleum naphtha. It is also strongly resistant in nitrocellulose films to discoloration by light.

Normal-butyloxy-succinic acid may be prepared from the di-butyl-butyloxy-succinate by subjecting the ester to hydrolysis. In this reaction the mixture is permitted to reflux for a period of five hours and the alcohol is then distilled off and the alkaline solution made acid. Extraction with two portions of ether, followed by evaporation of the ether, results in a viscous liquid which consists essentially of normal-butyloxy-succinic acid. It is highly soluble in both ether and chloroform. After the liquid material has been filtered it solidifies giving a product having a melting point of 73°–75° C.

In an analogous manner, phenols, including simple phenol, may be reacted with sodium hydroxide to form sodium phenate, which latter is then condensed, as above described, with maleic or fumaric acid to form the desired phenoxy derivative.

Diethyl phenoxy succinate obtained by condensing phenol and sodium phenate (the dried product obtained by reacting phenol with sodium hydroxide) with ethyl maleate should be treated with 10% sodium hydroxide for purposes of removing excess phenol. The ester layer which separates out may then be washed with water, followed by washing with diluted acid. It is then dried, purified by distillation under vacuum, and finally refractionated in an ordinary packed column. It possesses a boiling point of 166° C. at 6 mm. pressure (absolute).

It will be appreciated that metallic salts of half esters of maleic acid or fumaric acid may be substituted for the diethyl or dibutyl compounds above described. For example, the sodium salt of the half ester of maleic acid has been found by actual experience to be a satisfactory material for conducting the reaction.

The reaction also is applicable to the preparation of compounds of this general type, further examples of which are diethyl-ethyloxy-succinate, dipropyl-propyloxy-succinate, di-isobutyl-butyloxy-succinate and various other compounds of the same general chemical structure.

It will thus be apparent that the present invention provides a simple and convenient method of preparing ether derivatives of succinic acid which involves the use of relatively inexpensive promoters for the reaction. Also, these promoters are relatively safe and convenient to handle in large scale operations and are therefore of distinct advantage over materials heretofore employed.

Although I have shown and described only the preferred forms of the invention it will be apparent that numerous modifications may be made therein without departure from the spirit of the invention or from the scope of the appended claims.

What I claim is:

1. The method of preparing ether substituted succinic acid derivatives characterized in that an organic hydroxide selected from the group consisting of alcohols and phenols is reacted with caustic alkali under conditions whereby the water of reaction is removed and subsequently condensing the resulting alkali salt of the organic hydroxide and additional organic hydroxide with a material selected from the group consisting of salts, esters, and half ester salts of maleic acid.

2. A method of preparing ether substituted succinic acid derivatives which comprises reacting the hydroxide of an alkali metal with an organic hydroxide, eliminating the water of reaction from the resultant material and condensing the reaction product and additional organic hydroxide with a neutral ester of an unsaturated di-carboxylic acid selected from the group consisting of fumaric and maleic acids.

3. A method of preparing di-butylbutyloxysuccinate which comprises reacting butyl alcohol with sodium hydroxide to form sodium butylate, removing the water of reaction and reacting the resultant material with dibutyl maleate and additional alcohol.

4. A method of effecting the condensation of an organic hydroxide selected from the group consisting of alcohols and phenols with a material selected from the group consisting of salts, half ester salts and neutral esters of an unsaturated dicarboxylic acid containing 4 carbon atoms, which method comprises forming an alkali metal salt of the organic hydroxide by reacting the organic hydroxide with a hydroxide of an alkali metal, removing the water of reaction therefrom, and subsequently promoting said condensation in the presence of said salt of the organic hydroxide in catalytic proportion.

EDMUND B. TOWNE.